(12) United States Patent
Lai et al.

(10) Patent No.: US 7,382,428 B2
(45) Date of Patent: Jun. 3, 2008

(54) LIQUID CRYSTAL DISPLAY

(75) Inventors: Chao-Chih Lai, Miao-Li (TW); Tsau-Hua Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/644,199

(22) Filed: Dec. 22, 2006

(65) Prior Publication Data
US 2007/0146609 A1 Jun. 28, 2007

(30) Foreign Application Priority Data
Dec. 22, 2005  (CN) .......................... 2005 1 0121039

(51) Int. Cl.
*G02F 1/1337* (2006.01)
*G02F 1/1343* (2006.01)

(52) U.S. Cl. ..................... 349/129; 349/143
(58) Field of Classification Search ............... 349/129, 349/143
See application file for complete search history.

(56) References Cited

U.S. PATENT DOCUMENTS

| 5,040,875 | A | * | 8/1991 | Noguchi | .................... | 349/143 |
| 5,615,028 | A | * | 3/1997 | Ishiguro et al. | ............... | 349/42 |
| 6,882,393 | B2 | * | 4/2005 | Kawai et al. | ............... | 349/129 |
| 6,954,246 | B2 | * | 10/2005 | Kim et al. | .................. | 349/129 |
| 6,972,811 | B2 | * | 12/2005 | Song | ........................... | 349/38 |
| 7,126,660 | B2 | | 10/2006 | Woo | | |

* cited by examiner

*Primary Examiner*—James A. Dudek
(74) *Attorney, Agent, or Firm*—Wei Te Chung

(57) ABSTRACT

An exemplary liquid crystal display includes a first substrate (110), a second substrate (120) opposite to the first substrate, and a liquid crystal layer (130) therebetween. The first substrate includes a common electrode (140) having a plurality of slits (141). The second substrate includes a plurality of gate lines (121) and data lines (122). The slits are provided at positions corresponding to the gate lines and the data lines respectively.

7 Claims, 6 Drawing Sheets

LIQUID CRYSTAL DISPLAY

FIELD OF THE INVENTION

The present invention relates to a liquid crystal display with a common electrode pattern having slits or intervals that are located corresponding to positions of data lines and gate lines.

BACKGROUND

Liquid crystal displays (LCDs) generally have advantages of lightness in weight, a thin profile, flexible sizing, and low power consumption. For these reasons, LCDs are widely used in products such as laptops, personal digital assistants, mobile phones, and so on.

Referring to FIG. 9, this is a top view of a part of a display panel 10 of a conventional liquid crystal display. The display panel 10 includes a plurality of parallel gate lines 15 and a plurality of parallel data lines 16. The plurality of gate lines 15 and the plurality of data lines 16 are insulated from and cross each other, thereby cooperatively defining a plurality of pixel units (not labeled). Each pixel unit includes a thin film transistor 20, and a pixel electrode 27 connected to the thin film transistor 20. The thin film transistor 20 is connected to a corresponding one of the gate lines 15, and to a corresponding one of the data lines 16.

Referring also to FIG. 10, this shows a cross-sectional view of part of the display panel 10, corresponding to line X-X of FIG. 9. The display panel 10 includes a first substrate 11, a second substrate 12 arranged opposite to the first substrate 11, and a liquid crystal layer 13 interposed between the substrates 11, 12. A plurality of spacers 17 is disposed between the first substrate 11 and the second substrate 12, thereby maintaining a consistent cell gap. A common electrode 14 is disposed on an inside of the first substrate 11. The gate lines 15 are disposed on the second substrate 12, and the pixel electrodes 27 are disposed at the second substrate 12 and insulated from the gate lines 15. The gate lines 15 are overlapped by corresponding portions of the common electrode 14.

Referring also to FIG. 11, this shows a cross-sectional view of part of the display panel 10, corresponding to line XI-XI of FIG. 9. The data lines 16 are formed at an inside of the second substrate 12, and the pixel electrode 27 is insulated from the data lines 16. The data lines 16 are overlapped by corresponding portions of the common electrode 14.

Referring also to FIG. 12, this shows an equivalent circuit diagram of an exemplary one of the thin film transistors 20. The thin film transistor 20 includes a gate 21, a source 22, and a drain 23. The gate 21 is connected to the corresponding gate line 15, the source 22 is connected to the corresponding data line 16, and the drain 23 is connected to the pixel electrode 27. A parasitic capacitor 28 formed by the gate line 15 and the overlapping portion of the common electrode 14 is connected to the gate line 15. A parasitic capacitor 29 formed by the data line 16 and the overlapping portion of the common electrode 14 is connected to the data line 16.

When the display panel 100 is operating, firstly, a gate voltage A is transferred to the gate 21 through the gate line 15. The source 22 is connected to the drain 23 if the voltage A is larger than a threshold voltage of the thin film transistor 20. Secondly, if the source 22 is duly connected to the drain 23, a data voltage B is transferred to the source 22 through the data line 16, and begins to charge the pixel electrode 27 through the drain 23. If the voltage A is less than the threshold voltage, the source 22 is disconnected from the drain 23. The potential difference between the pixel electrode 27 and the common electrode 14 changes the tilt angle of liquid crystal molecules of the liquid crystal layer 13 at the pixel unit. Thereby, a desired amount of light transmission occurs at the pixel unit, and all the pixel units cooperate to make up an image that is displayed on a screen of the display panel 10.

The gate voltage A charges the parasitic capacitor 28 before being transferred to the gate 21, and the data voltage B charges the parasitic capacitor 29 before being transferred to the data 22. Therefore, signal distortion and delay are liable to occur during the transference of these voltages. These problems can in turn cause image flickering and impairment of the quality of images displayed on the screen.

Accordingly, what is needed is a liquid crystal display configured to overcome the above-described problems.

SUMMARY

An exemplary liquid crystal display includes a first substrate, a second substrate opposite to the first substrate, and a liquid crystal layer between the first substrate and the second substrate. The first substrate includes a common electrode, and plural slits are defined at the common electrode. The second substrate includes a plurality of gate lines and data lines. The slits are provided at positions corresponding to the gate lines and the data lines respectively.

A detailed description of embodiments of the present invention is given below with reference to the accompanying drawings.

BRIEF DESCRIPTION OF THE DRAWINGS

In the drawings, all the views are schematic.

DETAILED DESCRIPTION OF PREFERRED EMBODIMENTS

Figure 1:
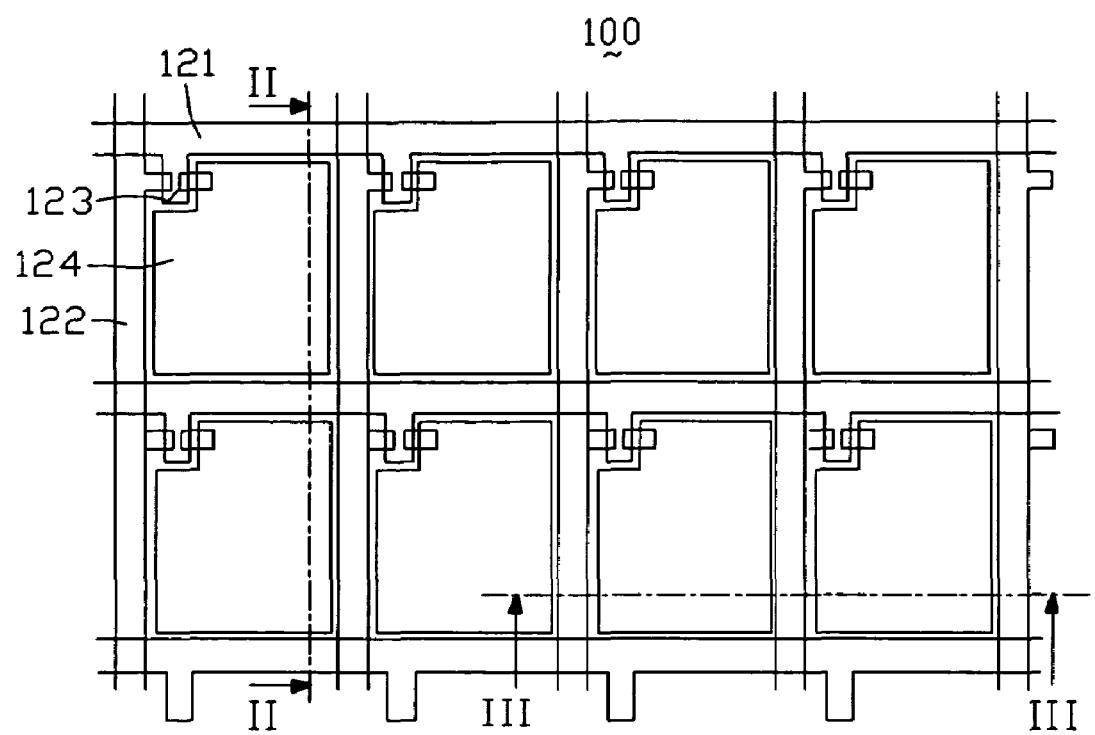
FIG. 1 is a top view of a part of a display panel of a liquid crystal display in accordance with a first embodiment of the present invention.

Referring to FIG. 1, this shows a top view of a part of a display panel 100 of a liquid crystal display of a first embodiment of the present invention. The display panel 100 includes a plurality of parallel gate lines 121 and a plurality of parallel data lines 122. The plurality of gate lines 121 and the plurality of data lines 122 are insulated from and cross each other, thereby cooperatively defining a plurality of display units (not labeled). Each display unit includes a thin film transistor 123, and a pixel electrode 124 connected to the thin film transistor 123. The thin film transistor 123 is connected to a corresponding one of the gate lines 121, and to a corresponding one of the data lines 122.

Figure 2:
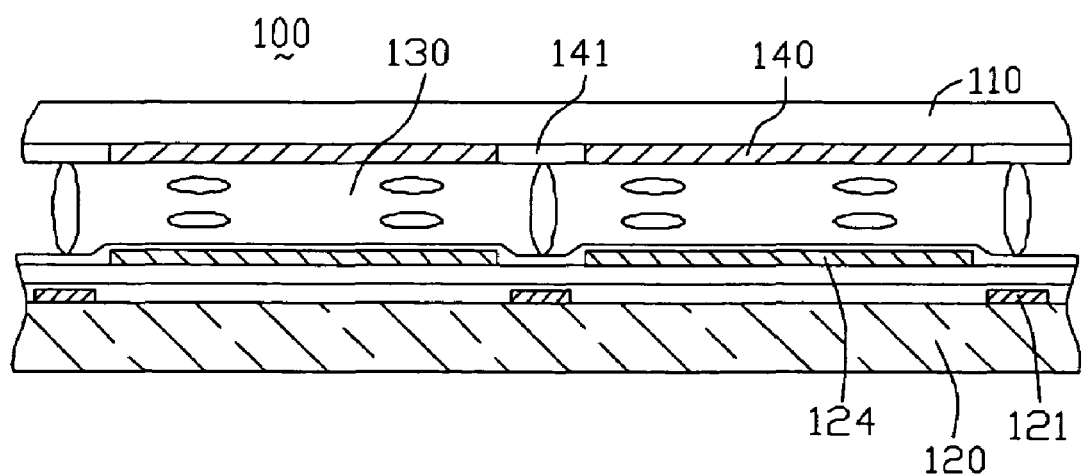
FIG. 2 is a cross-sectional view of part of the display panel shown in FIG. 1, corresponding to line II-II thereof.

Referring also to FIG. 2, this shows a cross-sectional view of part of the display panel 100, corresponding to line II-II of FIG. 1. The display panel 100 includes a first substrate 110, a second substrate 120 arranged opposite to the first substrate 110, and a liquid crystal layer 130 interposed between the substrates 110, 120. A common electrode 140 is disposed on an inside of the first substrate 110. The gate lines 121 are disposed on the second substrate 120, and the pixel electrodes 124 are disposed at the second substrate 12 and insulated from the gate lines 121. Each gate line 121 is connected with a corresponding row of the thin film transistors 123, as shown in FIG. 1. The common electrode 140 is made from indium tin oxide or indium zinc oxide. A plurality of first slits 141 is formed in the common electrode 140 at positions corresponding to the gate lines 121.

Figure 3:
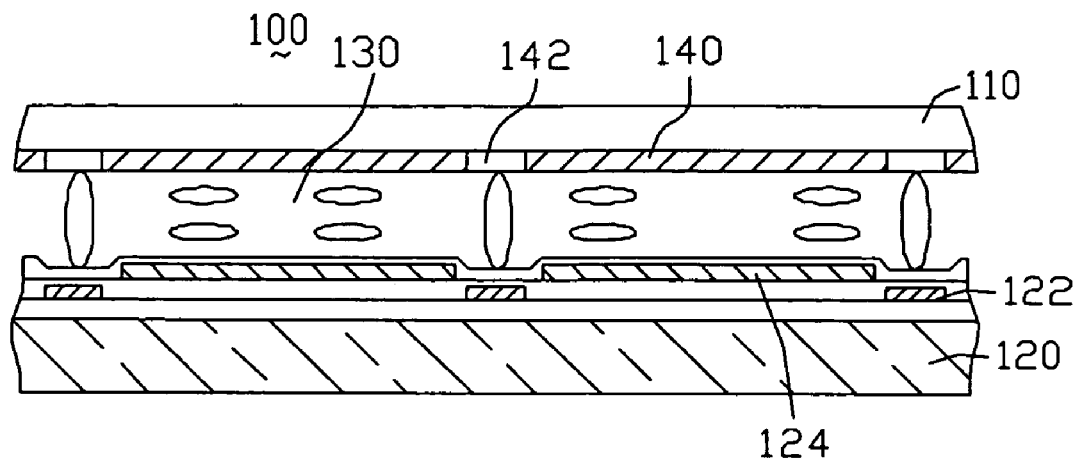
FIG. 3 is a cross-sectional view of part of the display panel shown in FIG. 1, corresponding to line III-III thereof.

Referring also to FIG. 3, this shows a cross-sectional view of part of the display panel 100, corresponding to line III-III of FIG. 1. The data lines 122 are formed at an inside of the second substrate 120, and are insulated from the pixel electrodes 124. Each data line 122 is connected with a corresponding column of the thin film transistors 123, as shown in FIG. 1. A plurality of second slits 142 are formed in the common electrode 140 at positions corresponding to the data lines 122.

When the display panel 100 is operating, at each display unit, the potential difference between the pixel electrode 124 and the common electrode 140 changes the tilt angle of liquid crystal molecules of the liquid crystal layer 130 at the display unit. Thereby, a desired amount of light transmission occurs at the pixel unit, and all the display units cooperate to make up an image displayed on a screen of the display panel 100.

Figure 4:
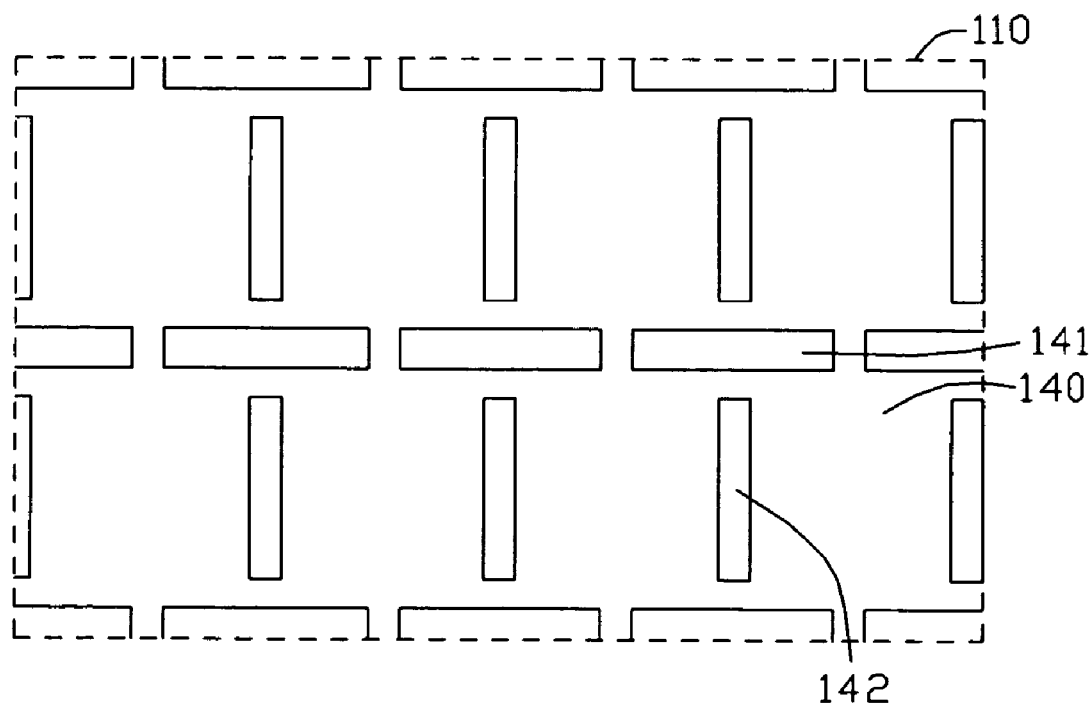
FIG. 4 is a top view corresponding to the view of the display panel of FIG. 1, showing a first substrate of the display panel, the first substrate having a common electrode, the common electrode having first slits and second slits.

Referring to FIG. 4, this is a top view of the first substrate 110 with the common electrode 140 having the first and second slits 141, 142. The common electrode 140 formed at the first substrate 110 includes the plurality of first and second slits 141, 142, which are strip-shaped. The first and second slits 141, 142 are formed at positions corresponding to the gate and data lines 121, 122 respectively. Widths of the first and second slits 141, 142 are accordance with widths of the gate and data lines 121, 122 respectively, as shown in FIG. 1.

Figure 5:
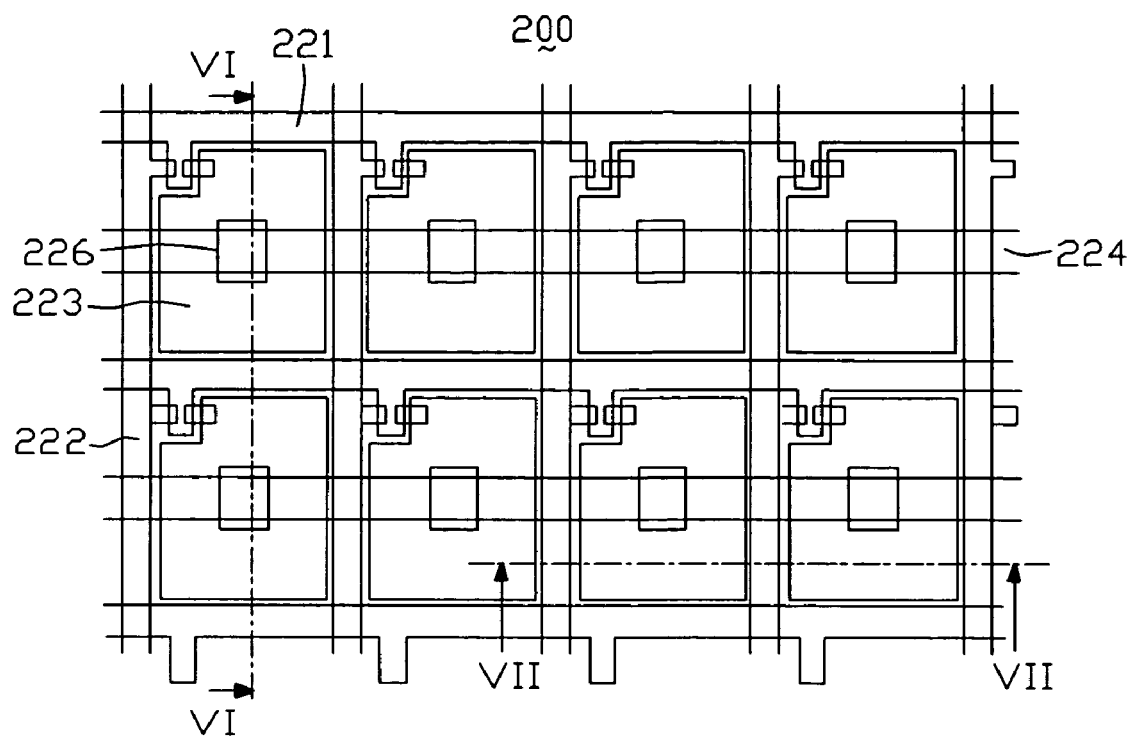
FIG. 5 is a top view of a part of a display panel of a liquid crystal display in accordance with second embodiment of the present invention.

Referring to FIG. 5, this shows a top view of a part of a display panel 200 of a second embodiment of the present invention. The display panel 200 includes a plurality of parallel gate lines 221, a plurality of parallel data lines 222, and a plurality of common lines 224 substantially parallel with the gate lines 221. The plurality of gate lines 221 and the plurality of data lines 222 are insulated form and cross each other, thereby cooperatively defining a plurality of display units (not labeled). Each display unit includes a thin film transistor (not labeled) connected to a corresponding one of the gate and data lines 221, 222 respectively, and a pixel electrode 223 connected to the thin film transistor. The pixel electrode 223 includes an opening 226 at position according to the common line 224.

Figure 6:
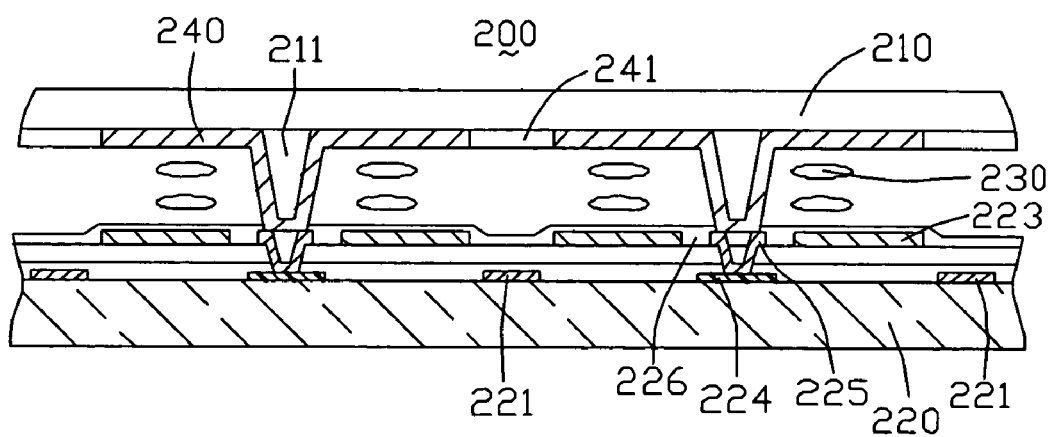
FIG. 6 is a cross-sectional view of part of the display panel shown in FIG. 5, corresponding to line VI-VI thereof.

Referring also to FIG. 6, this shows a cross-sectional view of part of the display panel 200, corresponding to line VI-VI of FIG. 5. The display panel 200 includes a first substrate 210, and a second substrate 220 arranged opposite to the first substrate 210, and a liquid crystal layer 230 interposed between the substrates 210, 220. A plurality of protrusions 211 is formed on the first substrate 210. A plurality of common electrodes 240 is disposed on inside of the first substrate 210 and covers the protrusions 211. A plurality of intervals 241 formed on the first substrate 241 separating each one of the common electrodes 240. The intervals 241 are formed at positions according to the gate and data lines 221, 222 and the widths thereof are accordance with the gate and the data lines 221, 222 shown in FIG. 5.

The gate lines 221 and the common lines are both formed at the first substrate 220 and insulated to each other. A plurality of connecting electrodes 225 is formed at the common electrode 240 and connected with the common electrode 240 allowing the common line 224 connecting to the common electrode 240. The pixel electrode 223 are formed at the second substrate 220 and insulated with the gate lines 221 and the common line 224. The connecting electrode 223 is insulated with the pixel electrode 226 by an opening 226 formed therebetween. A liquid crystal layer 230 is interposed between the first and second substrates 210, 220. Each gate line 221 is connected with a corresponding row of the thin film transistor as shown in FIG. 5.

Figure 7:
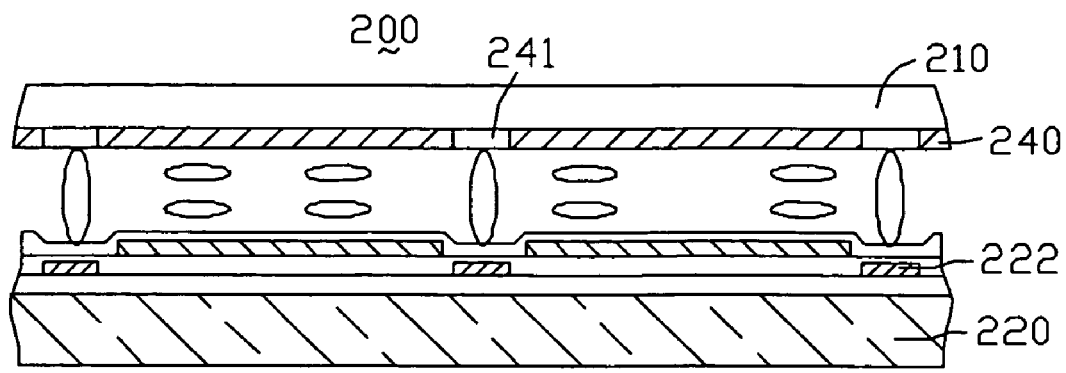
FIG. 7 is a cross-sectional view of part of the display panel shown in FIG. 5, corresponding to line VII-VII thereof.

Referring to FIG. 7, this shows a cross-sectional view of part of the display panel 200, corresponding to line VII-VII of FIG. 5. The data lines 22 are formed at the first substrate 220, and the intervals 241 are formed on the first substrate 210 at positions according to the data lines 222.

Figure 8:
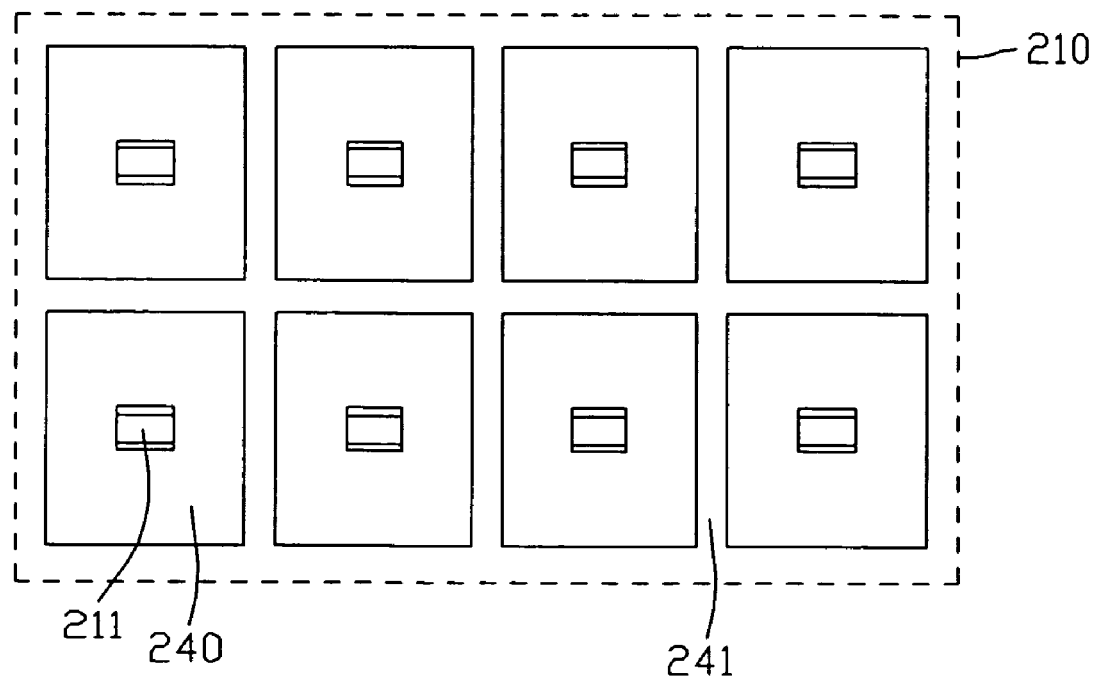
FIG. 8 is a top view corresponding to the view of the display panel of FIG. 5, showing a first substrate of the display panel, the first substrate having a plurality of insulated common electrodes.
Figure 9:
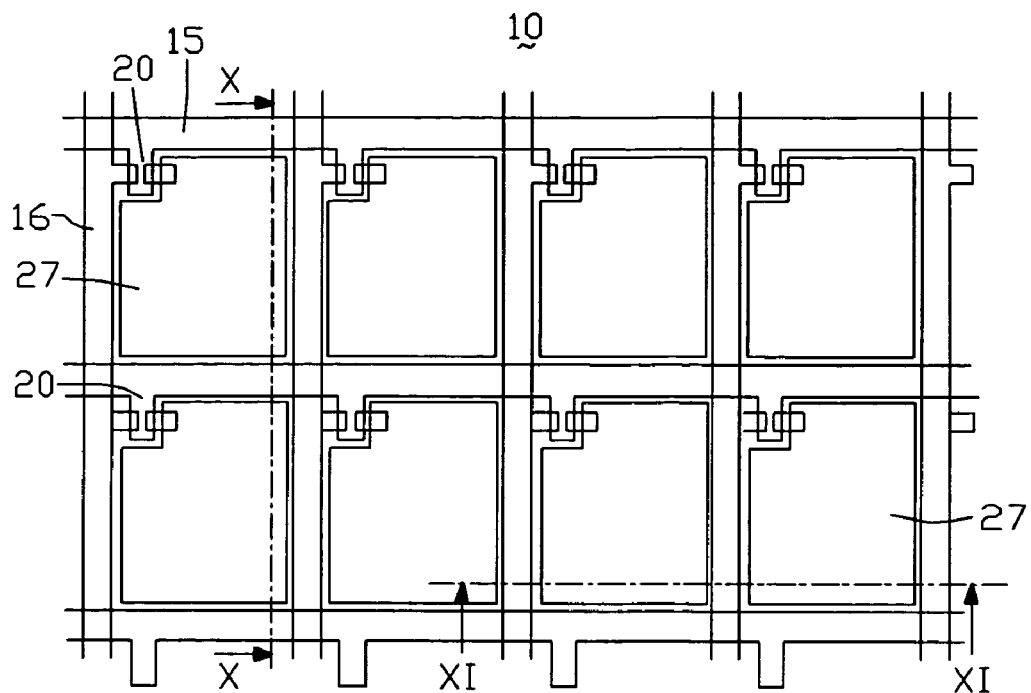
FIG. 9 is a top view of a part of a display panel of a conventional liquid crystal display.
Figure 10:
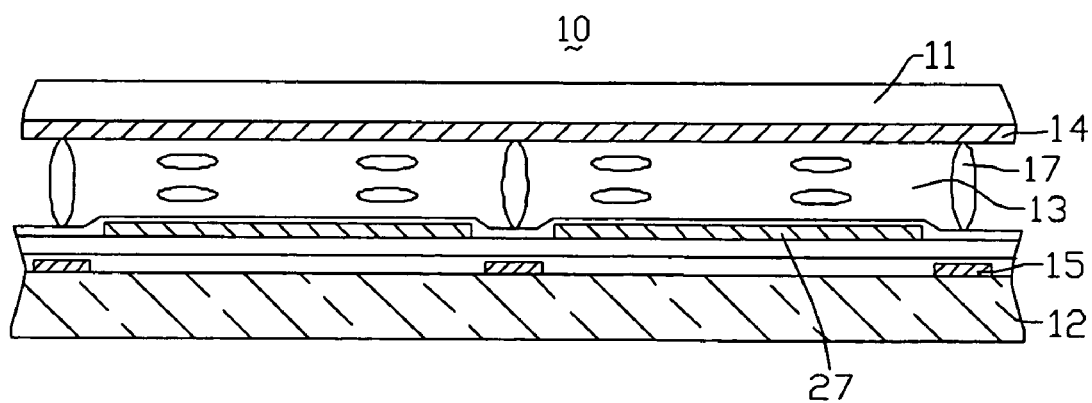
FIG. 10 is a cross-sectional view of part of the display panel shown in FIG. 9, corresponding to line X-X thereof.
Figure 11:
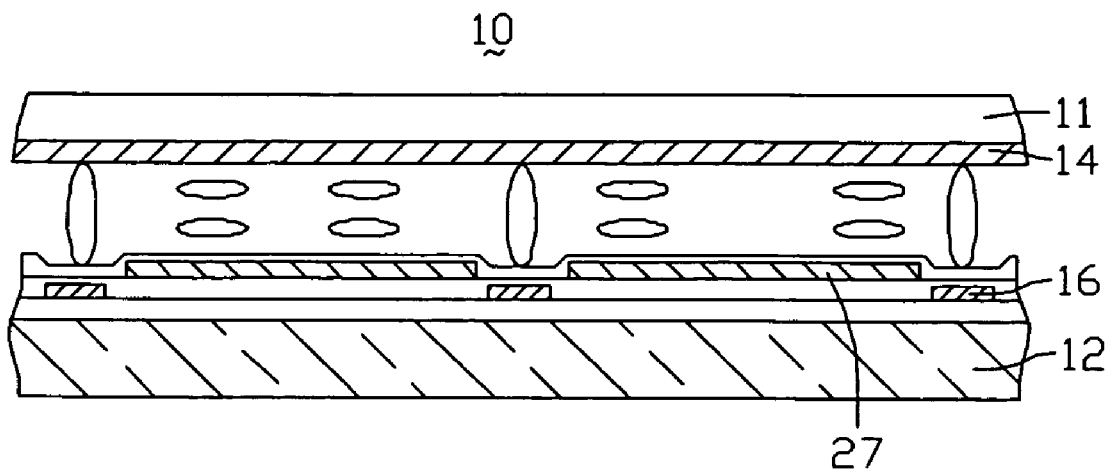
FIG. 11 is a cross-sectional view of part of the display panel shown in FIG. 9, corresponding to line XI-XI thereof.
Figure 12:
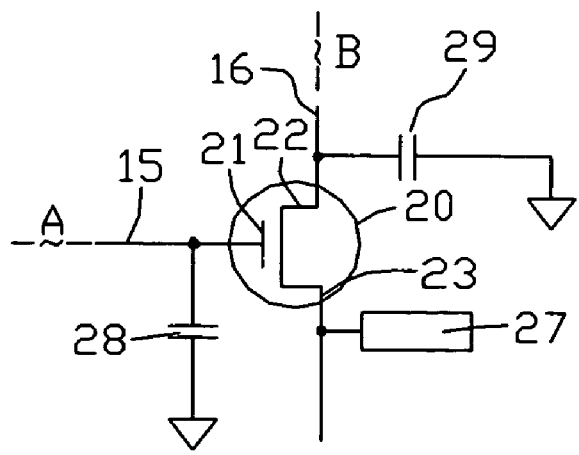
FIG. 12 is an equivalent circuit diagram of an exemplary one of thin film transistors of the display panel of FIG. 9.

Referring to FIG. 8, this is a top view of the first substrate 210 with the plurality of insulated common electrodes 240. The common electrodes 240 formed at the first substrate 210 are arranged in a matrix. Each common electrode 240 covers one protrusion 211, and is surrounded by four corresponding intervals 241.

Advantages of the above-described display panels 100, 200 include the following. The amount of overlapping of the gate lines 121 and the data lines 122 by corresponding portions of the common electrode 140 is reduced by the first and second slits 141, 142 respectively. Similarly, the amount of overlapping of the gate lines 221 and the data lines 222 by the common electrodes 240 is reduced or even eliminated by the intervals 241. Therefore parasitic capacitance between the gate lines 121 and the common electrode 140, and between the data lines 122 and the common electrode 140, is reduced. Similarly, parasitic capacitance between the gate lines 221 and the common electrodes 240, and between the data lines 222 and the common electrodes 240, is reduced. Thus signal distortion and delay and image flickering can be avoided, and the quality of images displayed by the display panels 100, 200 can be improved.

While the invention has been described by way of examples and in terms of preferred and exemplary embodiments, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display, comprising:
    a first substrate comprising a common electrode having a plurality of slits;
    a second substrate opposite to the first substrate, the second substrate comprising a plurality of gate lines and a plurality of data lines; and
    a liquid crystal layer between the first substrate and the second substrate;
    wherein the slits are provided at positions corresponding to the gate lines and the data lines respectively, and widths of the plurality of the slits are accordance with widths of the corresponding gate lines.

2. A liquid crystal display, comprising:
    a first substrate comprising a common electrode having a plurality of slits;
    a second substrate opposite to the first substrate, the second substrate comprising a plurality of gate lines and a plurality of data lines; and
    a liquid crystal layer between the first substrate and the second substrate;
    wherein the slits are provided at positions corresponding to the gate lines and the data lines respectively, and widths of the plurality of the slits are accordance with widths of the corresponding data lines.

3. The liquid crystal display as claimed in claim 1, wherein the common electrode is made from indium tin oxide.

4. The liquid crystal display as claimed in claim 1, wherein the common electrode is made from indium zinc oxide.

5. The liquid crystal display as claimed in claim 1, wherein slits corresponding to a same one of the gate and data lines are connected in line, thereby dividing the common electrode into a plurality of common electrode units.

6. The liquid crystal display as claimed in claim 5, wherein the second substrate comprises a plurality of connecting electrodes and a plurality of common lines, and the common electrode units are connected to the common lines by the connecting electrodes respectively.

7. The liquid crystal display as claimed in claim 1, wherein adjacent slits are disconnected.

* * * * *